United States Patent [19]
Rhee

[11] Patent Number: 5,770,059
[45] Date of Patent: Jun. 23, 1998

[54] WASTE WATER TREATMENT APPARATUS

[76] Inventor: Choong H. Rhee, P.O. Box 1041, Huntington Beach, Calif. 92647

[21] Appl. No.: 724,902

[22] Filed: Oct. 3, 1996

[51] Int. Cl.$^6$ ................................................. B01D 21/34
[52] U.S. Cl. .................. 210/170; 210/195.1; 210/257.1; 210/532.1; 210/538; 210/262
[58] Field of Search ..................................... 210/170, 194, 210/195.1, 257.1, 258, 259, 262, 513, 532.1, 538

[56] References Cited

U.S. PATENT DOCUMENTS

| | | | |
|---|---|---|---|
| 3,485,749 | 12/1969 | Reilly | 210/262 |
| 4,894,162 | 1/1990 | Cournoyer et al. | 210/626 |
| 5,433,845 | 7/1995 | Greene et al. | 210/170 |
| 5,441,632 | 8/1995 | Charon | 210/170 |
| 5,637,218 | 6/1997 | Kickuth | 210/257.1 |

OTHER PUBLICATIONS

Eckenfelder, Jr. "Principles of Water Quality Management," 1980 pp. 179–182.

*Primary Examiner*—Christopher Upton
*Attorney, Agent, or Firm*—Erik M. Arnhem

[57] ABSTRACT

A waste water treatment apparatus is located between an industrial plant and a municipal sewer to treat and control the flow of waste water from the plant to the sewer. The apparatus includes an equalization basin, a water clarifier mechanism, and a flow rate control mechanism for maintaining a relatively constant water flow rate through the clarifier in spite of major changes in water level in the equalization basin. The flow rate control mechanism includes an upstanding water column and a pump for delivering water from the equalization basin to the column. The column establishes a constant liquid head for controlling water flow through the clarifier.

4 Claims, 1 Drawing Sheet

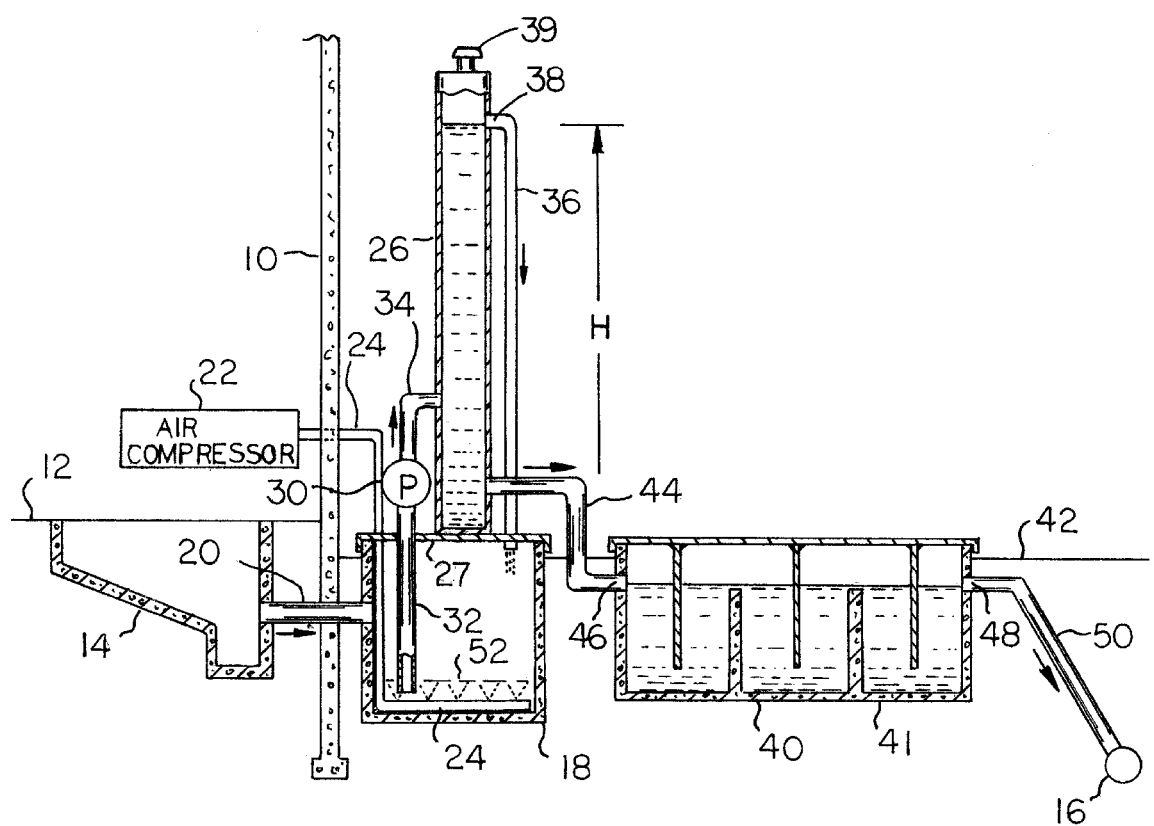

WASTE WATER TREATMENT APPARATUS

This invention relates to a waste water treatment apparatus, especially an apparatus for treating waste water discharged from an industrial facility prior to entry into the municipal sewer. A particular object of the invention is to provide a waste water pretreatment apparatus having the capability for smoothing or substantially equalizing the flow rate into the municipal sewer, in spite of surging conditions (or flow variations) in the waste water discharged from the industrial facility. The aim is to prevent overloading of the municipal sewer system that can produce unhealthy or unsanitary situations at manholes on the surface streets.

It is known that waste water discharged from an industrial plant can be temporarily held in an equalization basin before discharge to the municipal sewer. The equalization basin can be equipped with aeration devices fur supplying oxygen to any organics in the waste water, whereby a certain degree of micro-bial biodegrading activity takes place while the waste water is in the equalization basin; one of the effects is to reduce odors associated with the waste water after the waste water reaches the municipal sewer system.

A principal function of the equalization basin is to smooth or equalize the hydraulic load (flow) on the municipal water system, i.e. to prevent flow surges that could temporarily overload the system (should a large number of industrial plants discharge large quantities of waste water at the same time). Another function of some equalization basins is to mix and aerate the organics in the waste water so as to equalize the organic content of the waste water over time.

The term "equalization" can refer to flow rate equalization and also to organic content equalization (sometimes referred to as chemical oxygen demand and total susupeded solids).

One of the problems of conventional equalization basins is that such basins can handle only relatively short duration flow surges. Once the basin is filled up it acts merely as a flow conduit, without any surge suppressing effect. Also, with conventional equalization basins the flow rate out of the basin is not uniform; the flow rate can approach a surge rate when the basin approaches a full condition. Such problems can be partially overcome by making the basin relatively large.

The present invention relates to a waste water treatment system employing an equalization basin and a waste water clarifying means downstream from the basin. The waste water is aerobically treated and clarified prior to discharge into the municipal sewer.

A principal feature of the invention is a flow pumping and flow regulating means that keeps the equalization basin in a relatively unfilled condition during normal operating periods. Under surge conditions the equalization basin has a relatively large reserve space that can temporarily accommodate the surge flow.

An advantageous feature of the invention is that the flow regulating means produces a relatively constant flow rate into the clarifying means under normal operating periods and also under surge conditions. The clarifying means has a relatively good performance because the waste water is free of surges or pulses that could otherwise re-entrain small (light weight) particles into the waste water prior to its exit from the clarifying means.

In preferred practice of the invention, the system comprises a below-ground equalization basin adapted to receive waste water from an industrial plant, an upstanding tubular water column located above ground in the vicinity of the equalization basin, and a motor-operated pump arranged to pump waste water from the equalization basin into the upstanding water column. The water column has an overflow-pipe leading downwardly back into the underground basin, such as to effectively maintain the height of the water column at a predetermined level, i.e. the point where the overflow pipe is connected to the water column. The pump operates continuously as long as there is a minimum quantity of waste water in the equalization basin.

The upstanding water column is connected to an underground water clarifier tank means via a connector pipe that delivers waste water to the clarifier means at a point that is level with a water outlet of the clarifier means. The inlet-outlet arrangement is such that a constant water level is maintained in the clarifier means while waste water is being delivered to the clarifier means. This is advantageous in that the waste water in the clarifier means is in a quiescent state suitable for optimum gravitational separation of small particles out of the waste water passing through the clarifier means. The clarifier means delivers relatively sediment-free waste water to the municipal sewer.

THE DRAWINGS

The single figure of the drawings schematically illustrates a preferred apparatus constructed according to the invention.

DESCRIPTION OF A PREFERRED EMBODIMENT OF THE INVENTION

The drawing fragmentarily shows a building wall 10 of an industrial plant where waste water is generated. The building comprises a floor 12 containing a concrete sump pit, or other waste water collection mechanism 14 for delivery to a municipal underground sewer pipe 16 (shown at the right side of the figure).

The invention is concerned with a pretreatment apparatus for treating and controlling the flow rate of waste water between the time it leaves the building and the time it enters sewer pipe 16. The treatment apparatus comprises an underground equalization basin 18 connected to sump pit 14 via a conduit 20, whereby accumulated waste water flows in a left-to-right direction into the equalization basin.

The waste water in basin 18 is subjected to an aeration action with air supplied by an air compressor 22. Air conduit means 24 has a series of upwardly-directed nozzles (ports) for directing jets of air upwardly into the waste water in basin 18, whereby the organic and inorganic content in the waste water is subjected to an oxidizing action.

An upstanding tubular water column 26 is supported on the cover 27 of the equalization basin so that a motor-operated pump 30 can pump waste water from the basin into the column on a continuous basis (providing there is sufficient water in the basin). Pump 30 has an inlet conduit 32 extending downwardly into basin 18 and a discharge conduit (connection) 34 for delivering waste water into column 26.

An overflow pipe 36 extends downwardly from a connection point 38 on water column 26 into the interior space within basin 18, so that waste water is continuously overflowing out of the column back into basin 18 as long as pump 30 is operating. Connection point 38 effectively establishes the height of the water column. An air vent 39 in the upper end of the tubular water column prevents any pressure build-up above the water level in the column.

A water clarifier mechanism 40 is located underground below ground surface 42 to receive waste water from water column 26, via connector pipe 44. Pipe 44 is connected to column 26 at a point near the lower end of the column. Pipe 44 is connected to water clarifier means 40 at a point 46 that is at the same level as the water outlet 48 at the opposite (right) end of the clarifier tank.

The clarifier mechanism comprises an underground tank 41 having a series of vertical partitions or separators, whereby the waste water is required to rise and fall several times before traversing the zone between water inlet 46, through holes 43 in the separators, and waste water outlet 48. The waste water exits through outlet 48 into an underground pipe 50 leading to the municipal sewer pipe 16.

Clarifier tank 41 has a preferred volumetric capacity sufficient to retain the waste water for a minimum retention time of at least thirty minutes, with a relatively slow and constant flow rate through the tank 41.

The flow rate through clarifier tank 41 is determined by the height of the water column 26, i.e. the difference in elevation between the water level 38 in column 26 and the clarifier inlet 46. As long as the water column is maintained the flow rate through the clarifier will be constant so as to provide good particle separation activity in the clarifier. Sediment (particles) collect in the bottom of the clarifier tank.

The water level in clarifier tank 41 is kept constant by reason of the fact that inlet 46 and outlet 48 are at the same level.

The motor for pump 30 can be controlled by the level in column 26 or the level in equalization basin 18. For example, a float switch can be provided on basin 18 to keep the pump motor energized as long as the water level is at or above the value designated by numeral 52 in the drawing. As long as the pump is operating the level H will be maintained in water column 26; water will be continuously overflowing the waste water column back into basin 18 via the overflow pipe 36.

The operating level H in water column 26 establishes the static pressure for flowing waste water through clarifier means 40. The water flow rate is relatively constant in spite of waste water volumetric variations that may exist in basin 18 from time to time.

The water level in basin 18 can fluctuate, based on variations in the rate of flow of waste water into sump 14. However, such variations will not adversely affect the operation of clarifier mechanism 40 or the rate of discharge into sewer pipe 16. The flow into pipe 16 will be relatively constant, assuming a minimum continuous generation of waste water into the plant.

It will be seen that the relatively low water level 52 in basin 18 provides a relatively large reserve space for accommodating surge flows (above the water in basin 18). The system is able to handle surges that may exist for relatively long time periods. For a given size system, the waste water flow capacity is relatively good, due at least partly to the fact that the clarifier operates form a constant liquid H, so as to be in essentially continuous operation (providing waste water supplied to basin 18).

Some variations in structure and arrangement can be utilized while still practicing the invention. For example, the construction of clarifier means 40 and stabilization basin 18 can be varied. Also, multiple pumps can be used, alternately or on a standby basis, to improve system reliability. As shown, the system is located outdoors (underground and above ground). However, the system can be located in the plant (building) if so desired. In preferred practice of the invention, water column 26 is elevated relatively to basin 18 and clarifier mechanism 40 in order to establish the liquid head H.

What is claimed is:

1. A waste water treatment apparatus comprising:

an equalization basin receiving waste water from an industrial plant;

a waste water clarifier means receiving waste water discharged from said equalization basin; said clarifier means having a water outlet connectable to a municipal sewer; and flow control means interposed between said equalization basin and said clarifier means for maintaining a relatively constant flow rate into said clarifier means in spite of waste water volume variations in the equalization basin;

said flow control means comprising a liquid column means elevated above said equalization basin, and a motor-operated pump for pumping liquid from said basin into said liquid column means;

said liquid column means comprising an upstanding tube having a lower end and an upper end; said pump having a liquid connection to said tube located at an intermediate point between the tube upper and lower ends; said tube having a liquid outlet near its lower end connected to said clarifier means, and an overflow pipe extending from a point proximate to the tube upper end back to said basin.

2. The apparatus of claim 1, and further comprising an air vent means at the upper end of said upstanding tube.

3. A waste water treatment apparatus comprising:

a below ground equalization basin receiving waste water from an industrial plant;

an upstanding tubular water column located above ground in the vicinity of said equalization basin;

said tubular water column having a lower end and an upper end;

a motor-operated pump having an inlet connection to said equalization basin and a discharge connection to said water column; said discharge connection being located at an intermediate point between the upper and lower ends of the water column;

a below ground clarifier means adapted to receive waste water from said tubular water column via gravitational action; said clarifier means having a water outlet connectable to a municipal sewer;

an overflow pipe extending from said tubular column downwardly into said equalization basin; said overflow pipe being connected to said tubular column at a point near the column upper end, whereby the overflow pipe establishes the height of the liquid column; and a connector pipe between said tubular water column and said clarifier means; said connector pipe being connected to the water column at a point near the column lower end; said connector pipe being connected to said clarifier means at a point level with the clarifier means outlet, whereby the flow rate into the clarifier means is the same as the flow rate out of the clarifier means at any given time.

4. The apparatus of claim 3, wherein said tubular water column is located directly above the equalization basin.

* * * * *